Jan. 12, 1954    L. B. BORST    2,666,147
SPECTROMETER
Filed May 14, 1946

INVENTOR.
Lyle B. Borst
BY

Patented Jan. 12, 1954

2,666,147

UNITED STATES PATENT OFFICE 2,666,147

SPECTROMETER

Lyle B. Borst, Oak Ridge, Tenn., assignor to the United States of America as represented by the United States Atomic Energy Commission Application May 14, 1946, Serial No. 669,536

6 Claims. (Cl. 250—217)

This invention relates generally to the art of radiant energy spectrometry and, more particularly, to improvements in that type of spectrometer wherein a curved reflecting surface is utilized to focus the incident rays of radiant energy.

Heretofore, it has been known to employ a curved reflecting surface in a radiant energy spectrometer in order to permit the use of a divergent incident beam rather than a collimated incident beam. The divergent rays forming the incident beam are thus focussed on the intensity indicator after reflection from the reflecting surface, whereby a much greater output intensity as well as a relatively lower background is obtained.

In utilizing such a focussing spectrometer to obtain a wave length spectrum of the incident energy, it is necessary to continuously vary the angle of incidence of the median ray of incident energy, while maintaining equality between this angle and the angle of reflection of the median ray of the received reflected energy, and to continuously record the output intensity corresponding to each particular angle of incidence. It has heretofore been the practice to accomplish this by simultaneously moving the source of the divergent energy beam, and also the intensity indicator, by equal angular increments with respect to the reflecting surface, thereby maintaining equality between the angle of incidence and the angle of reflection while varying both.

The above procedure, however, is inconvenient in cases where the energy source is bulky and unwieldy, and in certain cases, for instance, where the source comprises a neutron reactor or chain reacting "pile," it is absolutely impossible to employ this procedure, the source being immovable. The present invention is concerned with overcoming the problems arising in the application of focussing spectrometers to the case where it is impractical to move the radiant energy source.

Accordingly, it is the primary object of the present invention to provide radiant energy spectrometry apparatus and methods particularly adapted for the analysis of energy radiated from a stationary source.

It is an object of the invention to provide a radiant energy focussing spectrometer wherein the radius of curvature of the reflecting surface may be adjusted.

It is another object of the invention to provide a radiant energy focussing spectrometer wherein the curved reflecting surface may be rotated about an axis perpendicular to the incident beam.

It is still another object of the invention to provide a radiant energy focussing spectrometer wherein the curved reflecting surface and the intensity indicator may be rotated to obtain a wave length spectrum of the radiant energy from a stationary divergent source while simultaneously maintaining the necessary conditions to insure proper focussing.

A still further object of the invention is to provide apparatus for segregating and focussing a monomchromatic beam of radiant energy from a divergent source having a continuous spectrum.

Other objects and advantages of the invention will become apparent from the following description, when taken in connection with the accompanying drawings, wherein one embodiment of the invention is illustrated.

The apparatus of the present invention has been particularly developed for the purpose of obtaining the energy distribution or velocity spectrum of a neutron beam derived from a chain reacting pile. It is known that a neutron beam has associated with it a wave length which is related to its velocity according to de Broglie's equation $$\lambda = \frac{h}{mv}$$

wherein $\lambda$ is the wave length, $h$ is Plank's constant, $m$ is the mass of the neutron, and $v$ is the velocity of the neutron. It is also known that such a neutron beam exhibits those phenomena of reflection, diffraction, and interference, ordinarily associated with wave motion, which phenomena are utilized in a conventional X-ray reflection spectrometry to obtain the wave length spectrum according to Bragg's law $n\lambda = 2d \sin \theta$, wherein $n$ is a small integer denoting the order of the reflection, $d$ is the distance between adjacent layers of the crystal reflector, and $\theta$ is the angle of incidence, which angle is equal to the angle of reflection.

It will be apparent, therefore, that reflection spectrometry, in general, is equally applicable to obtaining the velocity spectrum, or the corresponding wave length spectrum, of all types of radiant energy, be it the type normally thought of as being in the nature of discrete particles or in the nature of a wave motion. Accordingly, although the present invention is particularly described with respect to a specific application wherein the incident energy comprises a neutron beam, it will be understood that this is purely for the purpose of concreteness and clarity of the description, and it is not intended to limit the use of the invention to any particular kind of radiant energy.

Figure 1:
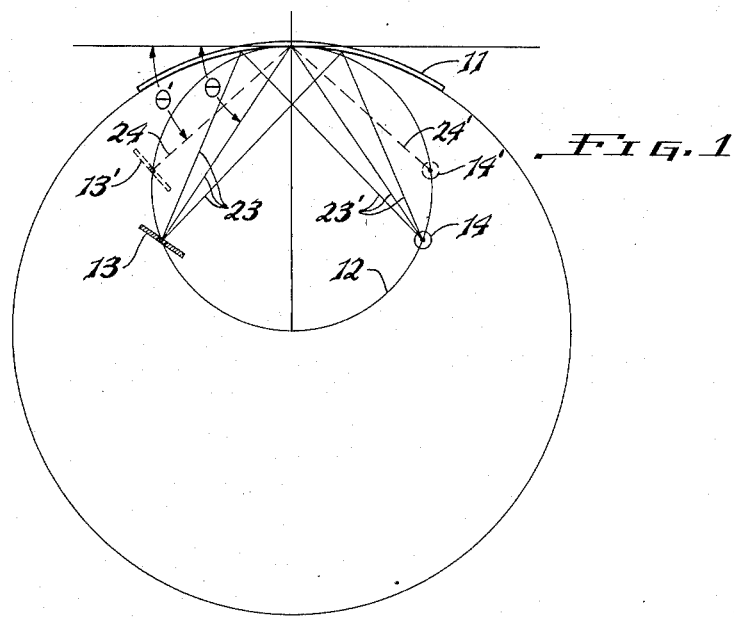
Fig. 1 is a schematic diagram illustrating the focussing action obtained by the curved reflecting surface and indicating the conventional manner of obtaining the spectrum of a movable source of radiant energy.

Referring now to Fig. 1 wherein a prior reflection focussing spectrometer and its method of use are illustrated, 13 represents a source of radiant energy, a beam of neutrons, in this case, which it is desired to analyze. This neutron beam is divergent as indicated by divergent rays 23. This divergent beam of neutrons impinges upon a fixed curved reflector 11, which may be, for instance, a quartz crystal having a cylindrical shape, and is thereby reflected and focussed as indicated by converging rays 23'. At the focal point of the reflected neutron beam there is provided any suitable type of neutron beam intensity indicator, indicated schematically at 14.

The neutron source 13 and the intensity indicator 14 are both located on the circumference of a circle 12 having a radius smaller than the radius of curvature of crystal 11. The angle of incidence and reflection are equal and are indicated at θ.

As is well known, the reflected neutron beam will be substantially monochromatic, that is, only those neutrons having a particular velocity (and associated wave length) will be reflected at any particular angle of incidence θ. The reading of the intensity indicator 14 provides a measure of the number of neutrons of this particular velocity which are contained in the incident beam. The velocity of the monochromatic reflected beam for a particular angle of incidence θ can be calculated from the previously referred to relationships of Bragg and de Broglie.

In order to obtain the complete velocity spectrum of the incident neutron beam it is necessary to continuously change the angle of incidence θ while maintaining the intensity indicator at a position so as to receive the monochromatic reflected beam which is reflected at an equal angle θ. This has hitherto been accomplished by shifting both the source 13 and indicator 14 simultaneously to new positions on the circle 12 as indicated in dotted lines at 13' and 14', respectively. Only the median rays 24 and 24' of the incident and reflected beams, respectively, for this new position are shown. The angle of incidence is now equal to a new value θ', and a monochromatic beam of a different velocity will be received and measured by indicator 14'.

Figure 2:
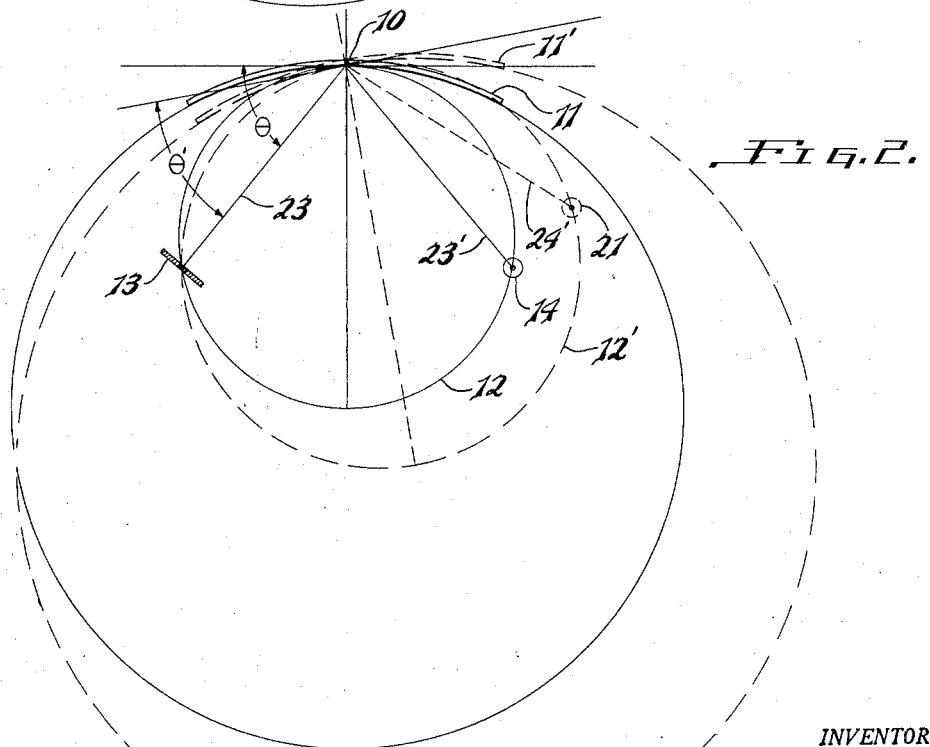
Fig. 2 is a schematic diagram illustrating the focussing spectrometer of the present invention and its manner of operation in obtaining the spectrum of a stationary divergent source of radiant energy while maintaining the conditions of focus.

Referring now to Fig. 2, wherein the improved focussing spectrometer of the present invention and its method of operation are illustrated, 13 again indicates a source of a divergent beam of neutrons 23. Only the median ray of the various neutron beams is shown in this figure. As before, only the neutrons of the particular velocity corresponding to the angle of incidence θ are reflected from the curved crystal 11 to form a convergent beam 23', which beam may be received and measured at an intensity indicator 14 disposed at the focal point. This focal point is located on the circumference of a circle 12 containing the source 13 and tangent to the crystal 11 at the point of incidence.

In the apparatus of Fig. 2, however, the source 13 is stationary, and the crystal 11 and intensity indicator 14 are both rotatable about a vertical central axis 10 lying in the plane of reflection of the crystal 11. The crystal 11 is also mounted so as to be bendable about axis 10 whereby its radius of curvature may be adjusted. Suitable mounting apparatus for supporting crystal 11 and simultaneously providing a manually adjustable control of its angular position about axis 10 and its radius of curvature is described in U. S. application Serial No. 698,340, for Curved Crystal Support, filed jointly in the names of Richard Fox and the present inventor on September 20, 1946, now Patent #2,579,225.

In operation of the present apparatus to obtain the velocity spectrum of the incident neutron beam 23, or to segregate a monochromatic neutron beam of a particular desired velocity, the crystal 11 is rotated about axis 10 to provide various new angles of incidence, and at each of these angular positions, the radius of cuvature of the crystal is adjusted to provide optimum focussing and the intensity indicator is rotated about axis 10 so as to intercept and measure the monochromatic reflected beam.

To illustrate the above procedure, the crystal 11 is shown dotted, as indicated at 11', after it has been rotated about axis 10 so as to provide a different and smaller angle of incidence θ'. In order to provide proper focussing for the monochromatic reflected beam at this new angle of incidence, the crystal is straightened out somewhat about axis 10 so as to have a different and larger radius of curvature, as shown. At the same time, the intensity indicator 14 is also rotated about axis 10 to a new position, indicated at 21, which position is the focal point of the monochromatic beam 24' reflected at the new angle of reflection θ'. This focal point will be located on the circumference of a circle 12' containing the source 13 and tangent to the rotated crystal 11' at the axis 10.

In this manner, the neutrons of any particular velocity may be segregated, focussed, and their intensity measured. If a velocity spectrum is desired, the above procedure may be repeated for continuously varing velocities. For each velocity it is necessary to compute the corresponding value of θ, rotate the crystal 11 and intensity indicator 14 so that the angle of incidence and reflection are both equal to θ, and adjust the radius of curvature of crystal 11 so as to provide optimum focussing of the monochromatic beam under consideration.

Since many changes in the above construction, and many apparently widely different embodiments of the invention could be made without departing from the scope thereof, it is intended that all matter contained in the above description or shown in the accompanying drawings shall be interpreted as illustrative and not in a limiting sense.

I claim:

1. A radiant energy spectrometer comprising a stationary source of radiant energy, a pivotally mounted crystal reflector having a uniformly arcuate cylindrical reflecting surface having an adjustable radius of curvature, said reflector being positioned to have its reflecting surface concave toward said source, whereby a monochromatic beam of energy will be segregated and focussed by said surface, the pivot axis of said reflector coinciding with an element of said cylindrical surface, and a radiant energy responsive device disposed at the focal point of the monochromatic reflected beam.

2. A radiant energy spectrometer comprising a stationary source of radiant energy, a pivotally mounted crystal reflector having a uniformly arcuate cylindrical reflecting surface having an adjustable radius of curvature, said reflector being positioned to have its reflecting surface concave toward said source, whereby a monochromatic beam of energy will be segregated and focussed by said surface, the pivot axis of said reflector coinciding with an element of said cylindrical surface, and a pivotally mounted radiant energy responsive device disposed at the focal point of the monochromatic reflected beam, the pivot axis of said device coinciding with the pivot axis of said reflector.

3. A radiant energy spectrometer comprising a source of radiant energy, a crystal reflector having a uniformly arcuate cylindrical reflecting surface, said reflector being positioned to have its reflecting surface concave toward said source, whereby a monochromatic beam of energy will be segregated and focussed by said surface, means for adjusting the radius of curvature of said surface, whereby the focal point of said beam may be adjusted, and a radiant energy responsive device disposed at the focal point of the monochromatic reflected beam.

4. A radiant energy spectrometer comprising a source of radiant energy, a pivotally mounted crystal reflector having a uniformly arcuate cylindrical reflecting surface, said reflector being positioned to have its reflecting surface concave toward said source, whereby a monochromatic beam of energy will be segregated and focussed by said surface, the pivot axis of said reflector coinciding with an element of said cylindrical surface, means for adjusting the radius of curvature of said surface, and a radiant energy responsive device disposed at the focal point of the monochromatic reflected beam.

5. A radiant energy spectrometer comprising a source of radiant energy, a pivotally mounted crystal reflector having a uniformly arcuate cylindrical reflecting surface, said reflector being positioned to have its reflecting surface concave toward said source, whereby a monochromatic beam of energy will be segregated and focussed by said surface, the pivot axis of said reflector coinciding with an element of said cylindrical surface, means for adjusting the radius of curvature of said surface, whereby the focal point of said beam may be adjusted, and a pivotally mounted radiant energy responsive device disposed at the focal point of the monochromatic reflected beam, the pivot axis of said device coinciding with the pivot axis of said reflector.

6. The method of employing a crystal reflector having a uniformly arcuate cylindrical reflecting surface to obtain a monochromatic beam of radiant energy from a divergent stationary multiple energy source of radiant energy, comprising the steps of positioning the reflector so that its reflecting surface is concave toward said source, rotating said reflector about an element of the cylindrical reflecting surface until the angle of incidence that the beam impinging on said element makes with respect to said surface is exactly equal to that angle ($\theta$) which corresponds to the desired monochromatic energy in accordance with Bragg's Law ($n\lambda = 2d \sin \theta$), adjusting the radius of curvature of the reflecting surface until the desired monochromatic energy which is being reflected from said surface at an equal angle ($\theta$) of emergence is focussed at a point which is the same distance from said element as is the source, and receiving the reflected energy at said point.

LYLE B. BORST.

References Cited in the file of this patent

UNITED STATES PATENTS

| Number | Name | Date |
|---|---|---|
| 408,511 | O'Brien | Aug. 6, 1889 |
| 1,457,209 | Chanier | May 29, 1923 |
| 1,951,404 | Goddard | Mar. 20, 1934 |
| 2,170,435 | Sweeney | Aug. 22, 1939 |
| 2,261,498 | Karcher | Nov. 4, 1941 |
| 2,377,862 | Bond | June 12, 1945 |
| 2,386,785 | Friedman | Oct. 16, 1945 |
| 2,394,622 | Luley | Feb. 12, 1946 |
| 2,452,045 | Friedman | Oct. 26, 1948 |

OTHER REFERENCES

Focusing X-Ray Monochromators by C. S. Smith, Review of Scientific Instruments, June 1941, pages 312–314.